(No Model.) 3 Sheets—Sheet 1.

S. W. HARMAN & F. H. ROMANS.
CHECK ROW ATTACHMENT FOR PLANTERS.

No. 531,117. Patented Dec. 18, 1894.

(No Model.) 3 Sheets—Sheet 2.

S. W. HARMAN & F. H. ROMANS.
CHECK ROW ATTACHMENT FOR PLANTERS.

No. 531,117. Patented Dec. 18, 1894.

(No Model.) 3 Sheets—Sheet 3.

S. W. HARMAN & F. H. ROMANS.
CHECK ROW ATTACHMENT FOR PLANTERS.

No. 531,117. Patented Dec. 18, 1894.

Witnesses
Severance
W. Harry Muzzy.

Inventors
Samuel W. Harman
& Freeland H. Romans,
By J. B. Lawyer
Attorney

UNITED STATES PATENT OFFICE.

SAMUEL W. HARMAN, OF ROGERS, AND FREELAND H. ROMANS, OF BENTONVILLE, ARKANSAS.

CHECK-ROW ATTACHMENT FOR PLANTERS.

SPECIFICATION forming part of Letters Patent No. 531,117, dated December 18, 1894.

Application filed June 6, 1894. Serial No. 513,673. (No model.)

*To all whom it may concern:*

Be it known that we, SAMUEL W. HARMAN, residing at Rogers, and FREELAND H. ROMANS, residing at Bentonville, in the county of Benton and State of Arkansas, citizens of the United States, have invented certain new and useful Improvements in Check-Row Attachments for Planters; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention has for its object to provide a laying out and taking up attachment for the wires of check row planters, and although we have in the accompanying drawings and following specification shown and described our invention as being a permanent attachment to a planter, we wish it understood that the several parts of the attachment and the supports therefor may be so constructed as to permit them to be readily applied to any of the numerous forms of planters now in use.

For the purpose of carrying out our invention, it therefore consists in the construction of the several parts of which it is composed, as will be hereinafter more fully described and claimed.

Figure 1:
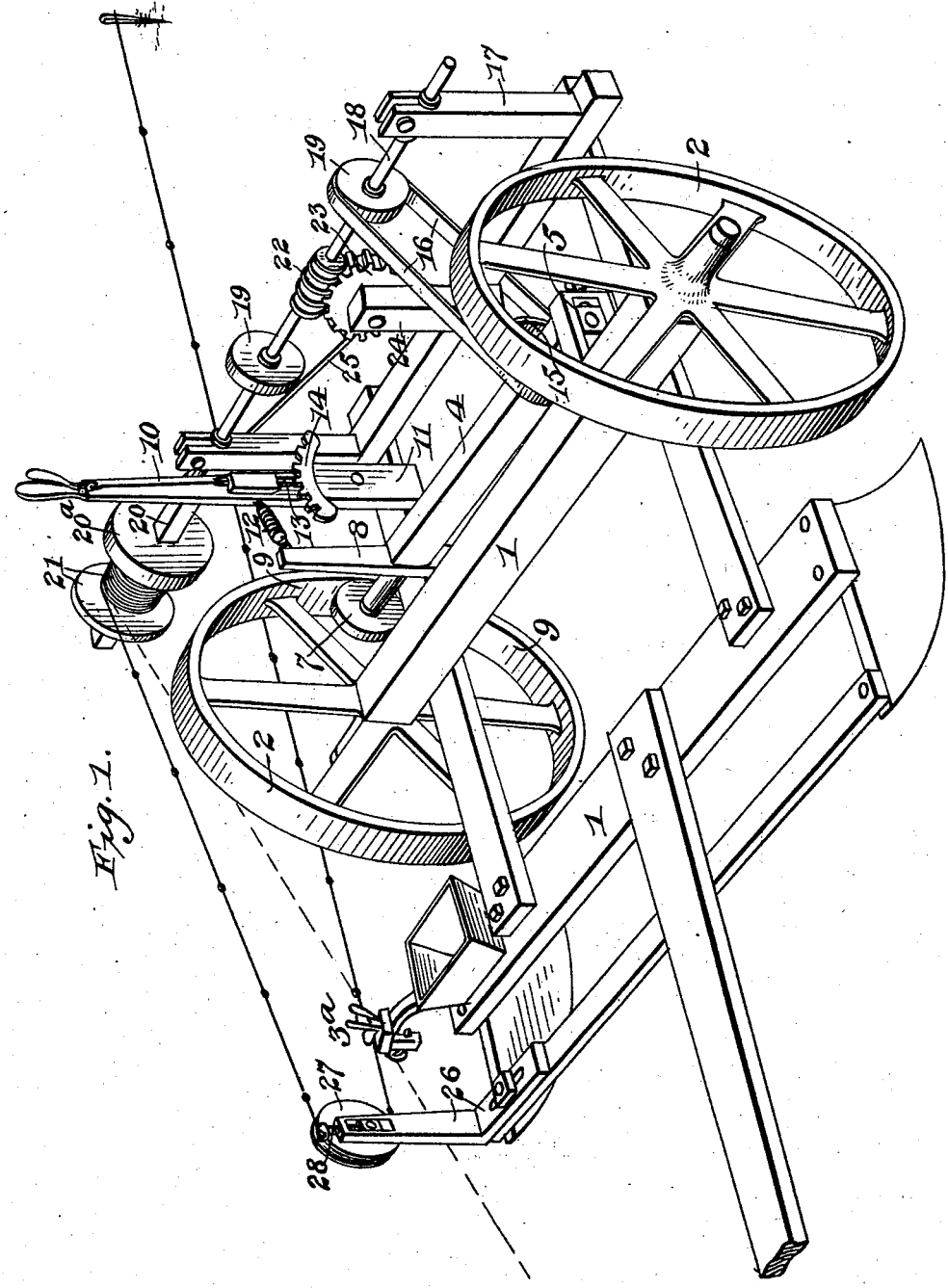
Figure 2:
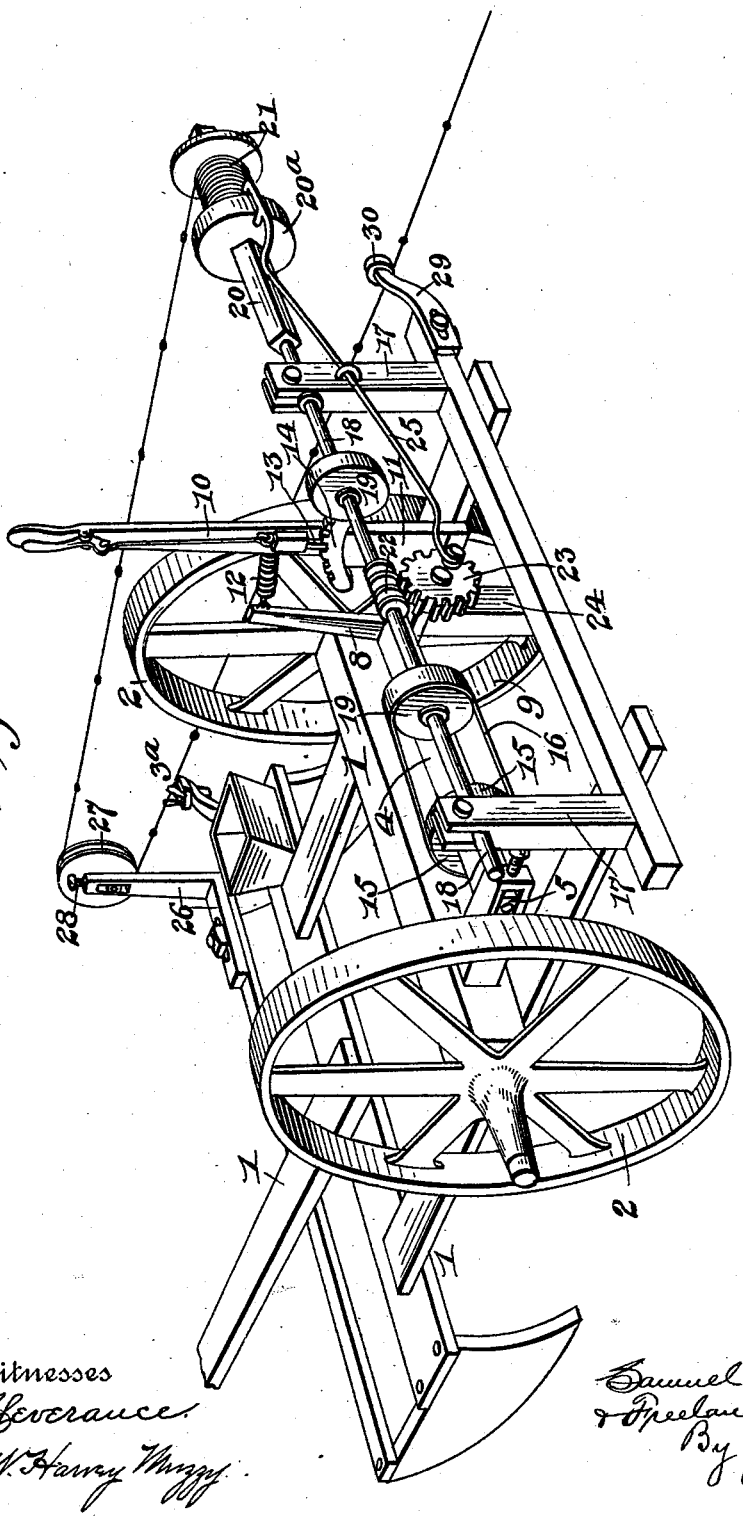
Figure 3:
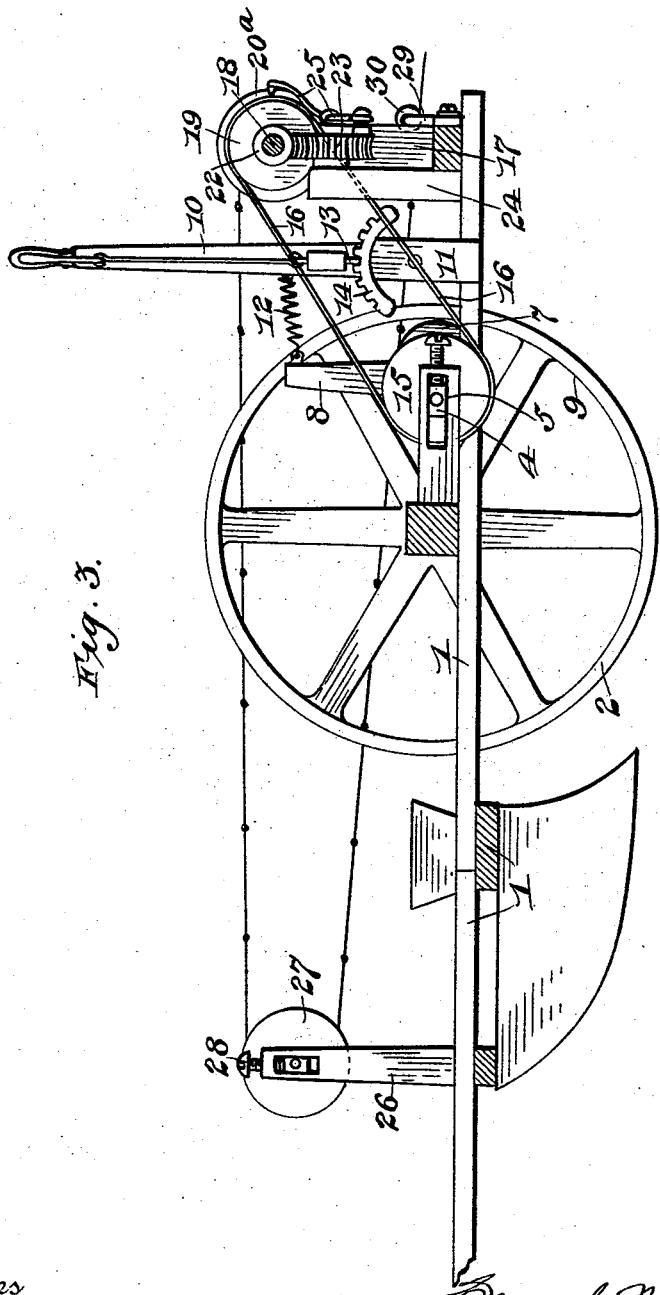

Referring to the accompanying drawings, in which corresponding parts are designated by similar marks of reference—Figure 1 is a perspective view taken from the front of our invention as applied to a planter. Fig. 2 is a corresponding view taken from toward the rear. Fig. 3 is a longitudinal vertical section.

As before stated the frame of the planter 1 may be of any approved construction, it being carried by the oppositely located wheels 2; and we have in the annexed drawings shown the forward part of the frame as provided with trencher runners, which may, if desired, carry the planting mechanism and the planter actuating mechanism 3ª; but such mechanism forms no part of our present invention, and needs therefore no further description here. A shaft 4 has one end supported in a boxing 5, adjustably mounted in the frame 1 of the planter, between the wheels 2 thereof, the opposite end of the shaft 4 being provided with a wheel 7 and carried in a rocking bar 8, which is pivoted below the shaft 4 to the frame 1, whereby the wheel 7 may be caused to bear upon the inner periphery of the flange or tread 9 of one of the wheels 2, and be thus rotated; and for this purpose the wheel 7 and the inner periphery of the flange 9 may be either provided with cog teeth to form a positive engagement, or to be left smooth, in order to form a frictional connection. A lever 10 is suitably pivoted on a standard 11 and has a spring connection 12 with the rocking bar 8, whereby the desired motion may be imparted to the latter to cause the engagement of the wheel 7 with the inner periphery of the tread 9, the lever 10 being held in position by the spring dog 13, engaging with the segmental rack 14, which rack may be so graduated as to show and measure the force with which the wheel 7 bears upon the periphery 9, and to thus indicate the tension that is upon the check wire through the mechanism now to be explained.

The shaft 4 which extends nearly across the planter between the wheels thereof has mounted on it near that end thereof which is carried in the boxing 5 a pulley or sprocket wheel 15; and by the adjusting of the shaft within this boxing, the tension of the belt or sprocket chain 16 that passes over the pulley or sprocket wheel may be regulated.

The planter frame has arising therefrom in the rear of the wheels 2, standards 17, having bifurcated tops to form bearings for the countershaft 18, which has rigidly secured upon it two pulleys or sprocket wheels 19, over either of which the belt or sprocket chain 16 may be passed, according to the position of the countershaft, that is to say, whether or not the countershaft is reversed in the standard 17 for taking up or laying down wire on the opposite side of the planter. One end of the countershaft 18 projects beyond the standard 17, and has keyed thereon the angular spool carrier 20, which in turn carries a flanged wheel 20ª. The spool 21 is mounted on the carrier 20, and is engaged by the flange of the wheel 20ª, and rotates therewith as the latter is driven by the connection between the tread 9 of the wheel 2 and the wheel 7 and through the shaft 4, pulleys or sprocket wheels 15 and 19, and belt or sprocket chain 16. Upon the countershaft 18, and midway between those parts of it that are contained in the shandards 17, is secured a worm 22, which engages with a worm wheel 23, mounted on a post 24 upon the frame 1, and to this worm wheel 23 is eccentrically secured a connecting rod 25, which is also secured to the wheel 20ª, by which the worm wheel 22 is connected with the spool 21; and it will be seen that as the countershaft is rotated and with it the spool and worm 22, that the latter imparts motion to the wheel 23, which in its revolution causes the spool to be moved laterally, whereby the hereinafter mentioned wire is caused to be uniformly wound thereon.

A bracket 26 is adjustably secured to the forward portion of the planter frame (it being adapted to be clamped to project beyond either side thereof, in order to provide for the reversibility of the countershaft), and carries in a slot in its vertical member the pulley 27, the said pulley being adjustable in the slot by means of a set screw 28. Similarly secured to the planter frame, but under the spool 21, is a second bracket 29, to receive a loose pulley 30, to act as a guide in discharging wire.

The operation of our invention is as follows: Let it be supposed that it is desired to plant the first row or rows. A suitable stake (see Fig. 1, which represents the planter when paying out such row), is driven at the beginning of the row, and a little on the inside thereof, and to this stake one end of a wire is secured, the opposite end of which is wound upon the spool, the wire having been first brought around the pulley 27 and passed through the planter actuating mechanism 3ª and under the pulley 30. As the planter now moves to the end of the row or rows, the wire is drawn from off the reel, and if the reel or spool in running loose permits the wire to run too lightly, resistance thereto may be put upon the spool by causing the wheel 7 to bear lightly upon the tread 9 of the wheel 2 through the medium of the rocking bar 8, lever 10 and spring 12. Upon reaching the end of the row, the end of the wire upon the spool may be properly secured to a stake at that edge of the field, or when the planter is turned and is started backward on its journey to the beginning of the row or rows in planting the last rows, the wire may be removed from off the pulleys 27 and 30, and run through the planter actuating mechanism 3ª of the spool, and the wheel 7 caused to bear with the desired amount of force against the tread 9 of the wheel 2, whereby the wire will be wound upon the spool as the planter approaches the stake and the beginning of the rows. The adjustable character of the brackets permits the distance between the rows successively planted by the machine to be varied; and it is obvious that by reversing from side to side, the countershaft and brackets, that the planter will be adapted to plant, when going in the reversed direction.

Having thus described our invention, what we claim, and desire to secure by Letters Patent of the United States, is—

1. The combination with a planter, of a check row attachment therefor, consisting of a shaft having a wheel thereon adapted to engage the wheel of the said planter, and to be driven thereby, a rocking bar pivoted at one of its ends and carrying the said shaft, mechanism whereby the said rocking bar may be moved, a countershaft carrying a spool, and a connection between the said first named shaft and the countershaft, whereby they are rotated together, substantially as described.

2. The combination with a planter, of a check row attachment therefor, consisting of a shaft having a wheel thereon, a rocking bar pivoted at one of its ends, and carrying at an intermediate point the said shaft, means whereby the rocking bar may be moved to cause the engagement of the wheel upon the said shaft with the tread of one of the wheels of the said planter, a reversible countershaft having a spool carried thereon, a spool mounted upon the said spool carrier, a connection between the said first named shaft and the countershaft, whereby the latter is rotated, a worm mounted on the said countershaft, a worm wheel adapted to engage with the said worm, and a connecting rod connected with the said spool, and eccentrically connected with the said worm wheel, substantially as described.

3. The combination with a planter, of a check row attachment therefor, consisting of a shaft mounted between the wheels of the planter, and having a wheel on one end thereof, a rocking bar pivoted at one of its ends to the frame of the planter, and carrying at an intermediate point that end of the said shaft which is pivoted to the said wheels, a graduated segment, a lever moving over the said segment, a spring connecting the said lever and the said rocking bar, whereby the said shaft may be moved to cause the engagement of the wheel thereon with the tread of one of the wheels of the planter, a pulley mounted on the said shaft, a reversible countershaft having a spool carrier thereon, and having two oppositely located pulleys, a belt passing over the pulley upon the first named shaft, and over one of the pulleys upon the countershaft, a spool mounted upon the said spool carrier, a worm mounted on the said countershaft, a worm wheel journaled to the frame of the said planter, and adapted to engage with the said worm, and a connecting rod connected with the said spool, and eccentrically connected with the said worm wheel, substantially as described.

4. The combination with a planter, of a check row attachment therefor, consisting of a shaft mounted between the wheels of the planter, and having a wheel on one end thereof, a rocking bar pivoted at one of its ends to the frame of the planter, and carrying at an intermediate point that end of the shaft which is provided with the said wheel, a graduated segment, a lever moving over the said segment, a spring connecting the said lever and the said rocking bar, whereby the said shaft may be moved to cause the engagement of the wheel thereon with the tread of one of the wheels of the planter, standards rising from the frame of the said planter, and having bearings in their upper ends, a reversible countershaft having a spool thereon, means for driving the countershaft from the first named shaft, a spool mounted upon the said spool carrier, a worm mounted on the said countershaft midway of its bearings, a worm wheel journaled to the frame of the said planter and engaging with the said worm, a connecting rod connecting with the said spool, and eccentrically connected to the said worm wheel, and reversible brackets having guide pulleys thereon mounted on the forward portion of the frame of the planter, substantially as described.

In testimony whereof we affix our signatures in presence of two witnesses.

SAMUEL W. HARMAN.
FREELAND H. ROMANS.

Witnesses:
W. J. NELSON,
S. J. RUSSELL.